United States Patent Office 2,993,774
Patented July 25, 1961

2,993,774
METHOD OF DESTROYING VEGETATION WITH TRITHIOCARBONATES
Philip C. Hamm, Webster Groves, Mo., and Kenneth L. Godfrey, St. Albans, W. Va., assignors to Monsanto Chemical Company, St. Louis, Mo., a corporation of Delaware
No Drawing. Filed Dec. 23, 1957, Ser. No. 704,278
12 Claims. (Cl. 71—2.3)

This invention relates to a method of destroying vegetation and to herbicidal compositions. More particularly, it relates to a method of destroying vegetation which comprises applying a lethal concentration of a halogen substituted aralkyl ester of a trithiocarbonic acid. These agents are effective against broadleaf plants and grasses.

The halogen substituted aralkyl esters of trithiocarbonic acids exert a hormone like action in either contact or pre-emergence application. Accordingly, by applying the toxicant to the plant is meant any means whereby the toxicant is brought into contact with living plants which latter include germinating seedlings, as for example by application to the ground before the plants emerge or by direct application to the foliage. Although the killing effect is especially severe against broadleaves, they exert a general lethal action. An object of the invention is to provide compositions for destruction of noxious vegetation. A particular object of the invention is to provide herbicidal compositions which are effective against broadleaf plants. Further objects will be apparent from the detailed description following.

The herbicides of this invention possess the structure

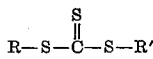

where R and R' represent haloaralkyl radicals.

Examples of the toxicants comprise
bis(o-chlorobenzyl)trithiocarbonate,
bis(m-chlorobenzyl)trithiocarbonate,
bis(2,3-dichlorobenzyl)trithiocarbonate,
bis(2,4-dichlorobenzyl)trithiocarbonate,
bis(2,5-dichlorobenzyl)trithiocarbonate,
bis(2,6-dichlorobenzyl)trithiocarbonate,
bis(2,6-dibromobenzyl)trithiocarbonate,
bis(3,5-dichlorobenzyl)trithiocarbonate,
bis(3,5-dichlorobenzyl)trithiocarbonate,
bis(2,4,5-trichlorobenzyl)trithiocarbonate,
bis(2,4,6-trichlorobenzyl)trithiocarbonate,
bis(2,4,5-tribromobenzyl)trithiocarbonate,
bis(2,4,6-tribromobenzyl)trithiocarbonate,
bis(2,3,6-tribromobenzyl)trithiocarbonate,
bis(3,4,5-trichlorobenzyl)trithiocarbonate,
bis(2,3,4-trichlorobenzyl)trithiocarbonate,
bis(2,3,5-trichlorobenzyl)trithiocarbonate,
bis(2,3,6-trichlorobenzyl)trithiocarbonate,
bis(2,3,4,6-tetrachlorobenzyl)trithiocarbonate,
bis(2,3,4,5-tetrachlorobenzyl)trithiocarbonate,
bis(2,3,5,6-tetrachlorobenzyl)trithiocarbonate,
bis(α-methyl-2,6-dichlorobenzyl)trithiocarbonate,
bis(α-methyl-2,3,6-trichlorobenzyl)trithiocarbonate and
bis(2,6-diiodobenzyl)trithiocarbonate.

There are a variety of procedures suitable for the preparation of the new herbicides and in general any of the methods suitable for the preparation of esters of thiocarbonic acids can be used. A particularly convenient synthesis which has been found to give excellent yields is to react a haloalkyl chloride with an alkali metal salt of the thio acid and separate the alkali metal chloride formed as a by-product. The preparation of bis(o-chlorobenzyl)trithiocarbonate and bis(trichlorobenzyl)trithiocarbonate is described in U.S. Patent No. 2,438,599 granted to Blake et al., March 30, 1948.

The following examples describe in detail the preparation of the esters but it is to be understood the invention is not limited thereto.

EXAMPLE 1

To 28.8 grams of $Na_2S \cdot 9H_2O$ dissolved in 200 cc. of methyl alcohol was added 13.7 grams of carbon bisulfide at a temperature of 25–30° C. The mixture was then stirred for about 2 hours at about 28° C. and 38.0 grams of p-chlorobenzyl chloride added gradually while keeping the temperature at 20–25° C. Stirring was continued for about an hour and the reaction mixture then heated to refluxing temperature for 2 hours. The product separated as a heavy yellow-orange oil insoluble in methyl alcohol. The solvent was removed by distillation under reduced pressure, the residue diluted with water and extracted with benzene and the solvent layer washed repeatedly with water and then dried over anhydrous sodium sulfate. After filtering the benzene was removed by distillation under 20 mm. pressure. The bis(p-chlorobenzyl)trithiocarbonate was a clear orange-red oil. The yield was 41.1 grams or 97% of the theoretical.

EXAMPLE 2

To 27.8 grams of carbon bisulfide dissolved in 500 ml. of methyl alcohol was added 80 grams of $Na_2S \cdot 9H_2O$ and the mixture stirred for about 90 minutes. To the solution of sodium trithiocarbonate was added 129.7 grams of 2,4-dichlorobenzyl chloride through a condenser. The reaction was exothermic, the temperature rising to 21° C. Stirring was continued for about an hour after the addition was complete and the mixture then heated to refluxing temperature (68° C.) for 2 hours. The solvent was removed by distillation in vacuo, the residue washed with cold water, dissolved in 500 ml. of benzene, the benzene solution washed twice with water, filtered through clay and the solvent removed in vacuo. The yield of bis(2,4-dichlorbenzyl)trithiocarbonate was 102.7 grams.

The next toxicants may be applied conveniently in the form of a spray containing the active ingredient in a concentration within the range of 0.1–10.0% by weight. The spray may be applied either to the foliage or to the ground before the plants emerge. Although the trithiocarbonates are insoluble in water, they are soluble in common organic solvents including mineral oil fractions. They may be dispersed directly in water or as a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecyl benzene sulfonate, or an amine salt of dodecyl benzene sulfonic acid, alkali metal salts of sulfated fatty alcohols, ethylene oxide condensation products of tall oil or alkyl phenols and the like.

The herbicidal activity of the compounds is illustrated by application to the foliage of bean and corn plants. The trithiocarbonate was emulsified in water and the emulsion containing the concentration of active ingredient shown in the table below was applied as a spray to the foliage and the effect on the plants recorded. The radical designated x,x,x-trichlorobenzyl was derived from trichlorobenzyl chloride prepared by chlorinating toluene in the ring in the presence of iron until the gain in weight corresponded to that calculated for trichlorotoluene and then removing the iron and chlorinating the side chain until the gain in weight corresponded to that calculated for trichlorobenzyl chloride. The latter prepared in this manner is a composite mixture of polychlorinated components having an average composition corresponding to trichlorobenzyl chloride. Probably several isomers are present. There may be a synergistic action from mixtures because the toxicants from crude chlorination products have in general been equal or superior to any pure component known to be present.

Table I

| Compound | Conc., percent | Phytotoxicity | |
| --- | --- | --- | --- |
| | | Bean | Corn |
| Bis(x,x,x-trichlorobenzyl)-trithiocarbonate. | 1.0 | moderate to severe. | severe. |

The plants reacted strongly to the toxicant, exhibiting profuse blooming and leaf cupping.

Table II illustrates the herbicidal activity of the compounds when applied to grasses and broadleaved plants.

Table II

| Compound | Conc., percent | Phytotoxicity | |
| --- | --- | --- | --- |
| | | Grasses | Broadleaves |
| Bis(2,4-dichlorobenzyl)-trithiocarbonate. | 1.0 | severe | moderate to severe. |
| Bis(o-chlorobenzyl)-trithiocarbonate. | 1.0 | extremely severe. | moderate. |

Herbicidal activity was also demonstrated by application to the ground before any plants emerged as illustrated in Table III.

Table III

| Compound | Rate Applied, Lbs./Acre | Results Observed |
| --- | --- | --- |
| Bis(x,x,x-trichlorobenzyl)-trithiocarbonate. | 50 | Severe phytotoxicity to wheat, oat, rye grass, buckwheat, mustard, red clover, beet, cucumber and cotton. |
| | 25 | Severe phytotoxicity to rye grass, red clover, sugar beet and moderate phytotoxicity to buckwheat, cheat grass and cucumber. |
| | 1 | Formative effect severe on all broadleaf species. Reading taken one month after application indicates virtually no plants surviving. |
| Bis(o-chlorobenzyl)-trithiocarbonate. | 25 | Grass specific. |

The formulation of dry herbicidal compositions is readily accomplished by mixing a finely divided solid carrier with a minor proportion of the toxicant. Carriers comprise talc, clay, pyrophyllite and silica. If the composition is intended for dispersion in water, the further addition of dispersing aids is advantageous. Since the trithiocarbonates are for the most part liquids, the proportions used for making apparently dry compositions are limited by the proportions which the solid carrier will absorb.

It is intended to cover all changes and modifications of the examples of the invention herein chosen for purposes of disclosure which do not constitute departures from the spirit and scope of the invention.

What is claimed is:

1. The method of destroying vegetation which comprises applying thereto a lethal concentration of a halogen substituted bisaralkyl ester of triothiocarbonic acid wherein the aryl radicals are phenyl radicals substituted by halogen selected from the group consisting of chlorine, bromine and iodine and the alkyl radicals are lower alkyl radicals in which the same carbon substituted by halogenated phenyl is attached to sulfur of the trithiocarbonic acid nucleus.

2. The method of destroying vegetation which comprises applying to the ground before the plants emerge a lethal concentration of a bis(chloro aralkyl) ester of trithiocarbonic acid wherein the aryl radicals are phenyl radicals substituted by chlorine and the alkyl radicals contain from 1 to 2 carbon atoms, the same carbon atom to which the chlorophenyl is attached being attached to sulfur of the trithiocarbonic acid nucleus.

3. The method of destroying vegetation which comprises applying to the ground before the plants emerge a lethal concentration of a bis(chlorobenzyl) trithiocarbonate containing at least one but not more than five chlorine atoms in the phenyl nucleus.

4. The method of destroying vegetation which comprises applying to the ground before the plants emerge a lethal concentration of bis(x,x,x-trichlorobenzyl) trithiocarbonate.

5. The method of destroying vegetation which comprises applying to the ground before the plants emerge a lethal concentration of bis(2,4-dichlorobenzyl) trithiocarbonate.

6. The method of destroying vegetation which comprises applying to the ground before the plants emerge a lethal concentration of bis(o-chlorobenzyl) trithiocarbonate.

7. The method of destroying vegetation which comprises applying to the foliage thereof a lethal concentration of a halogen substituted bisaralkyl ester of trithiocarbonic acid wherein the aryl radicals are phenyl radicals substituted by halogen selected from the group consisting of chlorine, bromine, and iodine and the alkyl radicals are lower alkyl radicals in which the same carbon substituted by halogenated phenyl is attached to sulfur of the trithiocarbonic acid nucleus.

8. The method of destroying vegetation which comprises applying to the foliage thereof a lethal concentration of a bis(chloro aralkyl) ester of trithiocarbonic acid wherein the aryl radicals are phenyl radicals substituted by chlorine and the alkyl radicals contain from 1 to 2 carbon atoms, the same carbon atom to which the chlorophenyl is attached being attached to sufur of the trithiocarbonic acid nucleus.

9. The method of destroying vegetation which comprises applying to the foliage thereof a lethal concentration of a bis(chlorobenzyl) trithiocarbonate containing at least one but not more than five chlorine atoms in the phenyl nucleus.

10. The method of destroying vegetation which comprises applying to the foliage thereof a lethal concentration of bis(x,x,x-trichlorobenzyl) trithiocarbonate.

11. The method of destroying vegetation which comprises applying to the foliage thereof a lethal concentration of bis(2,4-dichlorobenzyl) trithiocarbonate.

12. The method of destroying vegetation which comprises applying to the foliage thereof a lethal concentration of bis(o-chlorobenzyl) trithiocarbonate.

References Cited in the file of this patent

UNITED STATES PATENTS

| 2,021,726 | Hess | Nov. 19, 1935 |
| 2,607,673 | Goodhue et al. | Aug. 19, 1952 |

OTHER REFERENCES

Frear: "Catalogue of Insecticides and Fungicides," vol. 1, page 158, 1947.